(12) United States Patent
Ingram-Tedd et al.

(10) Patent No.: US 11,560,272 B2
(45) Date of Patent: Jan. 24, 2023

(54) SYSTEM AND METHOD FOR PICKING ITEMS

(71) Applicant: Ocado Innovation Limited, Hatfield (GB)

(72) Inventors: Andrew John Ingram-Tedd, Hatfield (GB); Lars Sverker Ture Lindbo, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 0 days.

(21) Appl. No.: 17/046,493

(22) PCT Filed: Apr. 10, 2019

(86) PCT No.: PCT/EP2019/059157
§ 371 (c)(1),
(2) Date: Oct. 9, 2020

(87) PCT Pub. No.: WO2019/197497
PCT Pub. Date: Oct. 17, 2019

(65) Prior Publication Data
US 2021/0130094 A1 May 6, 2021

(30) Foreign Application Priority Data
Apr. 10, 2018 (GB) ..................................... 1805917

(51) Int. Cl.
*B65G 1/137* (2006.01)
*B65G 1/04* (2006.01)
*B65G 1/06* (2006.01)

(52) U.S. Cl.
CPC ......... *B65G 1/1375* (2013.01); *B65G 1/0464* (2013.01); *B65G 1/065* (2013.01);
(Continued)

(58) Field of Classification Search
CPC .... B65G 1/0464; B65G 1/065; B65G 1/1375; B65G 2201/0202; B65G 2201/0285; B65G 2209/06
See application file for complete search history.

(56) References Cited

U.S. PATENT DOCUMENTS 8,276,739 B2 10/2012 Bastian et al.
8,425,173 B2 4/2013 Lert et al.
(Continued)

FOREIGN PATENT DOCUMENTS

CN 101641270 A 2/2010
CN 102725213 A 10/2012
(Continued)

OTHER PUBLICATIONS

Office Action dated Oct. 21, 2021, by the Chinese Patent Office in corresponding Chinese Patent Application No. 201980037406.8. (7 pages).
(Continued)

*Primary Examiner* — Saul Rodriguez
*Assistant Examiner* — Ashley K Romano
(74) *Attorney, Agent, or Firm* — Buchanan Ingersoll & Rooney PC (57) ABSTRACT

A system and method for picking items from storage containers located in stacks within a grid-based storage system are described. The system can include a movable structural member, movable from a first position to a second position such that when in the second position it is possible for an operative to access at least one row of storage containers such that items can be manually picked therefrom.

14 Claims, 10 Drawing Sheets

(52) U.S. Cl.
CPC ............... *B65G 2201/0202* (2013.01); *B65G 2201/0285* (2013.01); *B65G 2209/06* (2013.01)

(56) References Cited

U.S. PATENT DOCUMENTS

| | | | |
|---|---|---|---|
| 8,594,835 B2 | 11/2013 | Lert et al. | |
| 8,628,289 B1* | 1/2014 | Benedict | B65G 1/0478 414/217 |
| 8,740,538 B2 | 6/2014 | Lert et al. | |
| 8,956,099 B2 | 2/2015 | Olszak et al. | |
| 9,051,120 B2 | 6/2015 | Lert et al. | |
| 9,096,375 B2 | 8/2015 | Lert et al. | |
| 9,403,666 B2 | 8/2016 | Olszak et al. | |
| 9,694,975 B2 | 7/2017 | Lert et al. | |
| 9,708,122 B1 | 7/2017 | Johncox | |
| 9,725,239 B2 | 8/2017 | Lert et al. | |
| 9,771,217 B2 | 9/2017 | Lert et al. | |
| 10,035,649 B2 | 7/2018 | Lert et al. | |
| 10,239,691 B2 | 3/2019 | Lert et al. | |
| 10,442,622 B2 | 10/2019 | Lert et al. | |
| 10,556,743 B2 | 2/2020 | Sullivan et al. | |
| 10,717,599 B2 | 7/2020 | Lert et al. | |
| 11,124,361 B2 | 9/2021 | Lert et al. | |
| 2008/0014062 A1* | 1/2008 | Yuyama | B65G 65/00 414/331.01 |
| 2008/0181753 A1 | 7/2008 | Bastian et al. | |
| 2010/0316468 A1 | 12/2010 | Lert et al. | |
| 2010/0316469 A1 | 12/2010 | Lert et al. | |
| 2010/0316470 A1 | 12/2010 | Lert et al. | |
| 2010/0322746 A1 | 12/2010 | Lert et al. | |
| 2010/0322747 A1 | 12/2010 | Lert et al. | |
| 2012/0282068 A1* | 11/2012 | Tschurwald | B65G 1/0485 414/281 |
| 2013/0094926 A1 | 4/2013 | Olszak et al. | |
| 2014/0088758 A1 | 3/2014 | Lert et al. | |
| 2014/0148947 A1* | 5/2014 | Levesque | G07F 9/026 700/237 |
| 2014/0271063 A1 | 9/2014 | Lert et al. | |
| 2014/0277693 A1 | 9/2014 | Naylor | |
| 2015/0044002 A1 | 2/2015 | Olszak et al. | |
| 2015/0266672 A1 | 9/2015 | Lert et al. | |
| 2016/0129587 A1* | 5/2016 | Lindbo | G06Q 10/083 700/218 |
| 2016/0176636 A1* | 6/2016 | Kazama | G05B 19/41895 700/214 |
| 2016/0185526 A1 | 6/2016 | Lert et al. | |
| 2016/0376103 A1* | 12/2016 | De Angelis | B65G 1/065 414/284 |
| 2017/0313514 A1* | 11/2017 | Lert, Jr. | B65G 1/0478 |
| 2017/0362032 A1 | 12/2017 | Sullivan et al. | |
| 2018/0016098 A1 | 1/2018 | Lert et al. | |
| 2018/0035625 A1* | 2/2018 | Lindbo | B65G 1/0464 |
| 2018/0044110 A1 | 2/2018 | Clarke et al. | |
| 2018/0162639 A1 | 6/2018 | Ingram-tedd et al. | |
| 2018/0275664 A1 | 9/2018 | Fujii et al. | |
| 2018/0286002 A1* | 10/2018 | Peck | G06Q 50/28 |
| 2018/0319590 A1 | 11/2018 | Lindbo et al. | |
| 2018/0334325 A1 | 11/2018 | Lert et al. | |
| 2019/0031399 A1* | 1/2019 | Shaikh | B65D 25/14 |
| 2019/0218034 A1 | 7/2019 | Caveney | |
| 2019/0263589 A1* | 8/2019 | Clarke | B65G 57/03 |
| 2019/0270591 A1* | 9/2019 | Lert, Jr. | B65G 1/0435 |
| 2020/0039744 A1 | 2/2020 | Lert et al. | |
| 2020/0148474 A1* | 5/2020 | Salichs | B65G 1/0492 |
| 2020/0172336 A1 | 6/2020 | Sullivan et al. | |
| 2020/0346866 A1 | 11/2020 | Lert et al. | |
| 2021/0163222 A1* | 6/2021 | Austrheim | B61B 13/00 |
| 2021/0387804 A1* | 12/2021 | Austrheim | G07F 11/62 |

FOREIGN PATENT DOCUMENTS

| | | |
|---|---|---|
| CN | 103043356 A | 4/2013 |
| CN | 107472787 A | 12/2017 |
| EP | 2738720 A1 | 6/2014 |
| EP | 3030504 B1 | 2/2018 |
| KR | 20180016422 A | 2/2018 |
| NO | 317366 B1 | 10/2004 |
| WO | 03095339 A1 | 11/2003 |
| WO | 2016198467 A1 | 12/2016 |
| WO | 2017081275 A1 | 5/2017 |
| WO | 2017135098 A1 | 8/2017 |
| WO | 2018141876 A1 | 8/2018 |

OTHER PUBLICATIONS

International Search Report (PCT/ISA/210) dated Sep. 12, 2019, by the European Patent Office as the International Searching Authority for International Application No. PCT/EP2019/059157.
Written Opinion (PCT/ISA/237) dated Sep. 12, 2019, by the European Patent Office as the International Searching Authority for International Application No. PCT/EP2019/059157.
Office Action (Examination Report No. 1) dated May 14, 2021, by the Australian Patent Office in corresponding Australian Patent Application No. 2019250435. (3 pages).
Office Action (Examination Report) dated Sep. 5, 2022, by the Great Britain Patent Office in corresponding Great Britain Patent Application No. GB1905082.2. (4 pages).
Office Action (Request for the Submission of an Opinion) dated Aug. 16, 2022, by the Korean Patent Office in corresponding Korean Patent Application No. 10-2020-7032146, and an English Translation of the Office Action. (13 pages).
Office Action dated Sep. 20, 2022, by the Canadian Patent Office in corresponding Canadian Patent Application No. 3,097,226. (4 pages).

* cited by examiner

SYSTEM AND METHOD FOR PICKING ITEMS

The present invention relates to a system and method for picking items from a storage and picking system. More specifically but not exclusively, it relates to a system and method for picking items to fulfil customer orders in an online retailing environment, said order picking system comprising item presentation systems and devices.

Some commercial and industrial activities require systems that enable the storage and retrieval of a large number of different stock items.

In one known type of system for the storage and retrieval of items of multiple product lines, the items are located in storage bins or containers. The bins or containers are arranged in stacks on top of one another, the stacks being arranged in rows. The storage bins or containers are accessed from above and removed from the stacks by load handling devices.

EP 3030504 B1 (Ocado Innovation Limited) the content of which is incorporated herein by reference, describes a robotic picking system in which stacks of containers are arranged within a frame structure. A system of this type is illustrated schematically in FIGS. 1 to 5 of the accompanying drawings. The robotic load handling devices are controllably moved around on a system of tracks, the tracks forming a grid located above the stacks of containers. In the robotic picking system described in EP3030504 B1, the grid comprises a series of grid spaces defined by the tracks, each stack of containers being located within the footprint of a single grid space. In use, the robotic load handlers run on the tracks above the stacks and are controllably positioned above a predetermined stack of containers. Once in position, a lifting mechanism is lowered, a part of which, a gripper device, engages with a container and lifts said bin or container from the stack in to a cavity within the load handling device. In this particular system the cross-section of the robotic load handling device substantially conforms to the area of a single grid space.

Furthermore, the tracks and robotic load handling devices are configured such that two load handling devices may occupy adjacent grid spaces and pass each other in either direction when in operation.

Other forms of robotic load handling device are described in, for example, Norwegian patent number NO 317366 B1 (Autostore AS), the content of which is incorporated herein by reference, in which cantilever-type load handling devices disclosed occupy two grid spaces when in operation. It will be appreciated that in the context of the invention described in more detail below with reference to the specific embodiments any form or configuration of load handling device may be used in place of the two examples described above.

Such storage systems remove the need for aisles between the storage and picking areas and also allow a higher density of storage of products or items in the fulfilment centre for a given volume.

In the known, grid-based, robotic picking systems described above and with reference to EP 3030504 B1 (Ocado Innovation Limited), the storage bin or container being lifted from a stack may contain inventory items needed to fulfil a customer order. Once lifted by the load handling device, the storage bin or container is delivered by the load handling device to an output port above or adjacent a pick station or to the pick station per se. At the pick station, the required inventory item or items may be manually or robotically removed from the storage bin or container and placed in a delivery container, the delivery container forming part of the customer order, and being filled for dispatch at the appropriate time.

It will be appreciated that such an order may comprise a plurality of delivery containers, the number of delivery containers required being defined by the number of items or products ordered. Accordingly, a large number of containers or bins may need to be moved from storage positions within stacks to the pick stations.

Advantageously, the modular nature of grid-based picking systems enables an overall picking and storage system to be built in stages and expanded as required, thereby spreading out capital expenditure and costs as necessary.

It will be appreciated that such grid-based picking systems are generally designed and specified for an average throughput over a predetermined period of time. However, there are peak points of throughput in a year that will exceed the average for which the system was designed. At these times it would be advantageous for the system to include additional output ports and pick stations, but these components may represent a relatively large investment for a short, peak period and as such not be economical to include in an initial system specification.

Additionally, the number of pick stations in a grid-based system is limited by the space available for the footprint of the pick stations and the storage system as a whole in the chose building. As a result of this, frequently required items and products need to be transported many times by the robotic load handlers, thereby increasing the load handler movements required and further congestion at output ports.

It will be appreciated that known storage and picking systems described above, are operated under the control of computer utilities acting so as to control the movement and location of storage bins or containers and delivery containers, the movement and location of stock, and the location and number of operatives required at any given point in the system. Additionally, in a grid-based system the computer utilities control the movement and location of the load handling devices and may control the communication between the load handling devices and the order picking system.

According to the invention there is provided a system for picking items from storage, the system comprising a grid-based storage system, the storage system comprising a series of storage containers, the storage containers comprising items to be stored, the storage containers being located in stacks within a framework, the storage system further comprising movable structural means for dividing at least one row of storage containers from the remaining storage system, the at least one divided row of storage containers being accessible to an item picker such that items may be picked from the storage containers by the item picker.

According to the invention there is further provided a method of manually picking items from a grid based storage system, the storage system comprising a series of storage containers, the storage containers comprising items to be stored, the storage containers being located in stacks within a framework, the method comprising the steps of: providing movable structural means at a first position adjacent the edge of the storage system; moving the structural means from the first position to a second position in which at least one row of storage containers is exposed at the edge of the storage system; and picking at least one item from an exposed container in to a delivery container.

Advantageously, the invention provides access to containers to be directly accessed thereby enabling items to be manually or robotically placed or picked from or to storage or delivery containers. Furthermore, entire containers, delivery or storage containers, may be input or removed to or from the storage system without requiring additional automation.

In this way, the present invention overcomes the problems of the prior art and provides a system and method of temporarily increasing the possible throughput of a given system without requiring the number of output ports and pick stations to be increased.

The invention will now be described with reference to the accompanying diagrammatic drawings in which.

In the description below, 'storage bins or containers 10' will be used to denote containers, bins or totes intended for the storage of inventory items, whilst 'delivery containers DT' will be used to denote containers, bins or totes intended to be filled to fulfil orders placed by customers, in an online retail environment or otherwise. It will be appreciated that this terminology is used for ease of reference and explanation within this document. However, it should be noted that the storage bins 10 and the delivery containers DT may be of the same shape and configuration. Furthermore, delivery containers DT may be stored in bins 10 within the storage system or any part thereof. It is the function of the bin, container or tote that defines the category of container rather than any change in the actual size, shape, or configuration.

Figure 1:
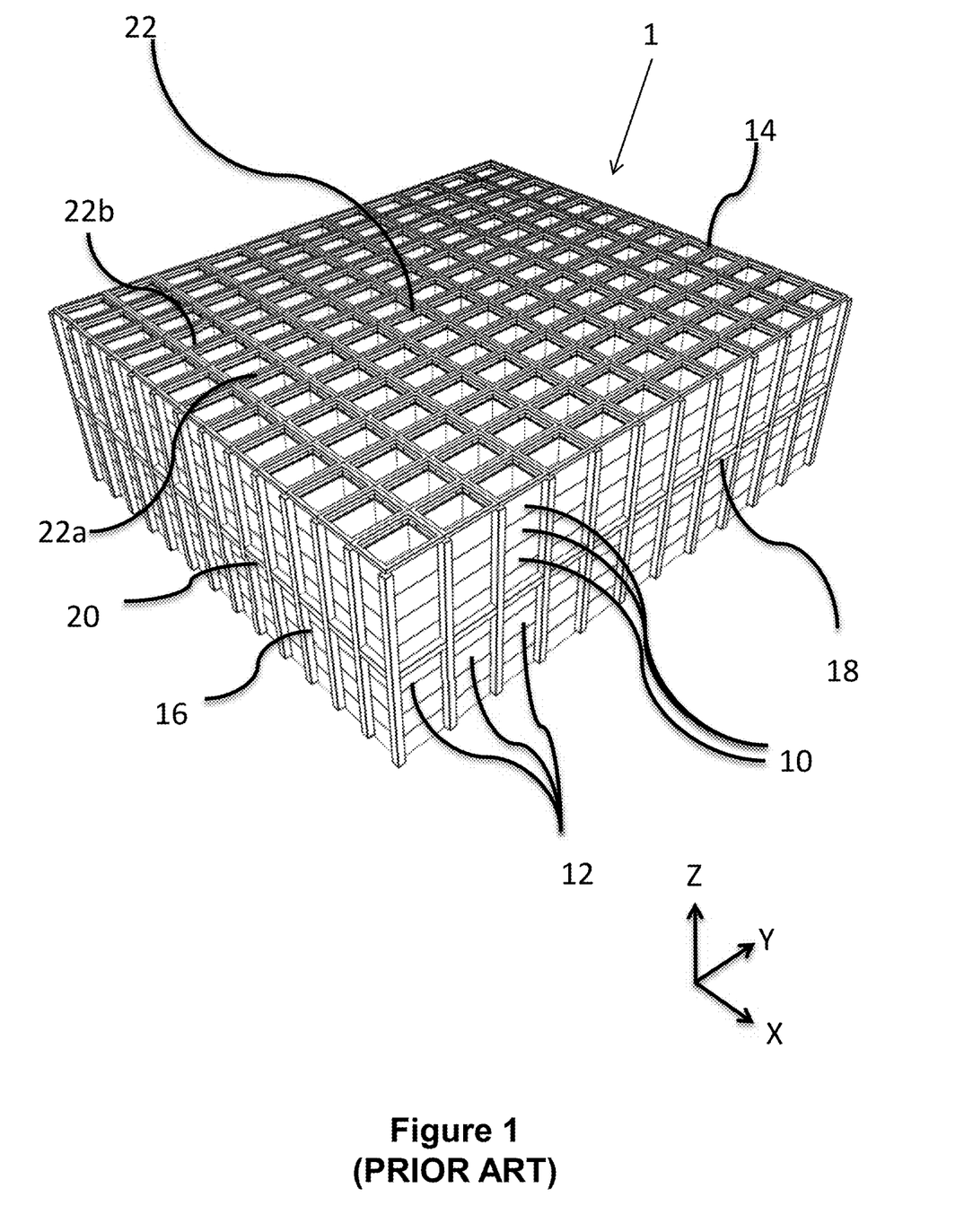
FIG. 1 is a schematic perspective view of a frame structure for housing a plurality of stacks of containers in one known form of storage system.
Figure 2:
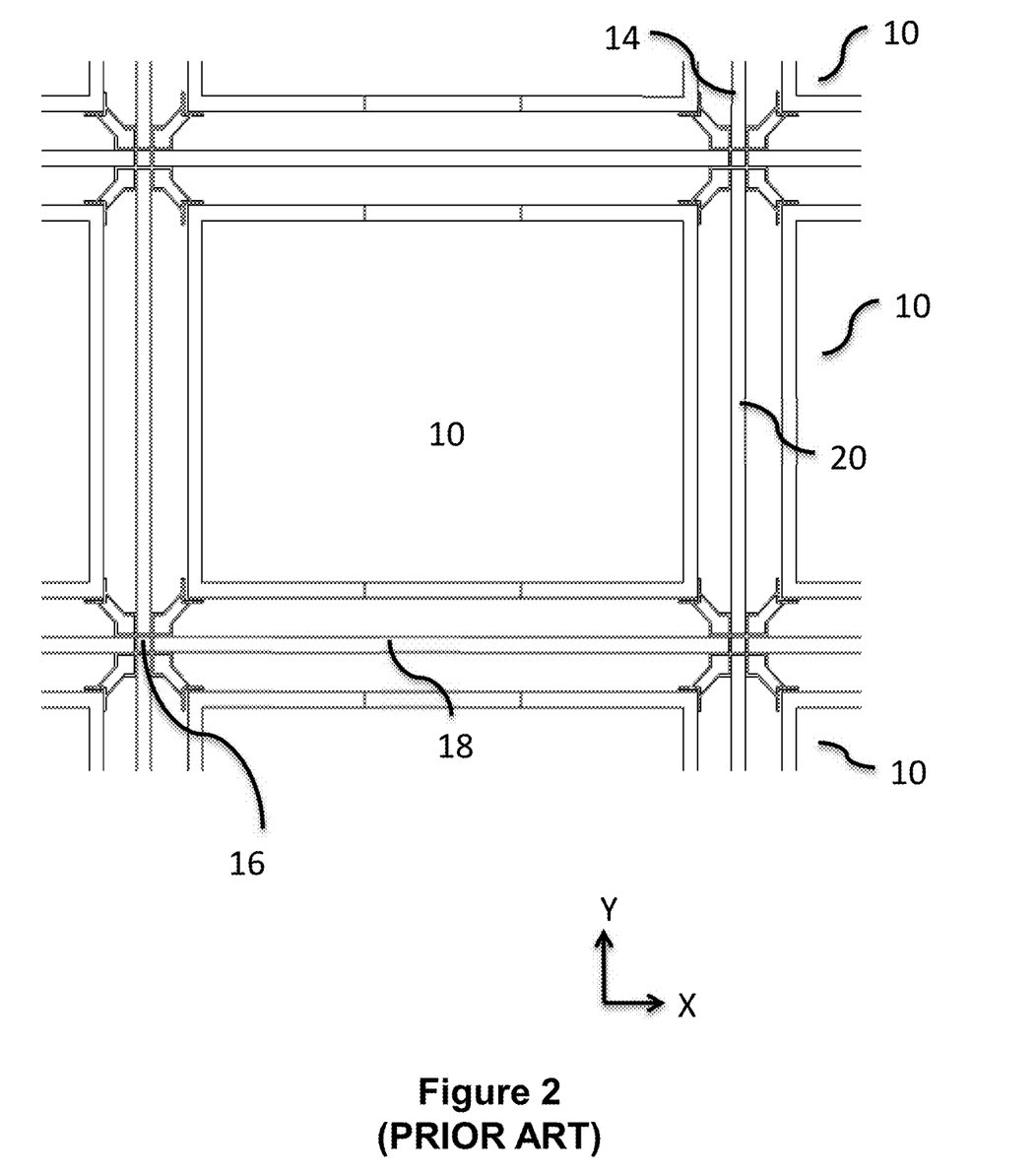
FIG. 2 is a schematic plan view of part of the frame structure of FIG. 1.
Figure 3A:
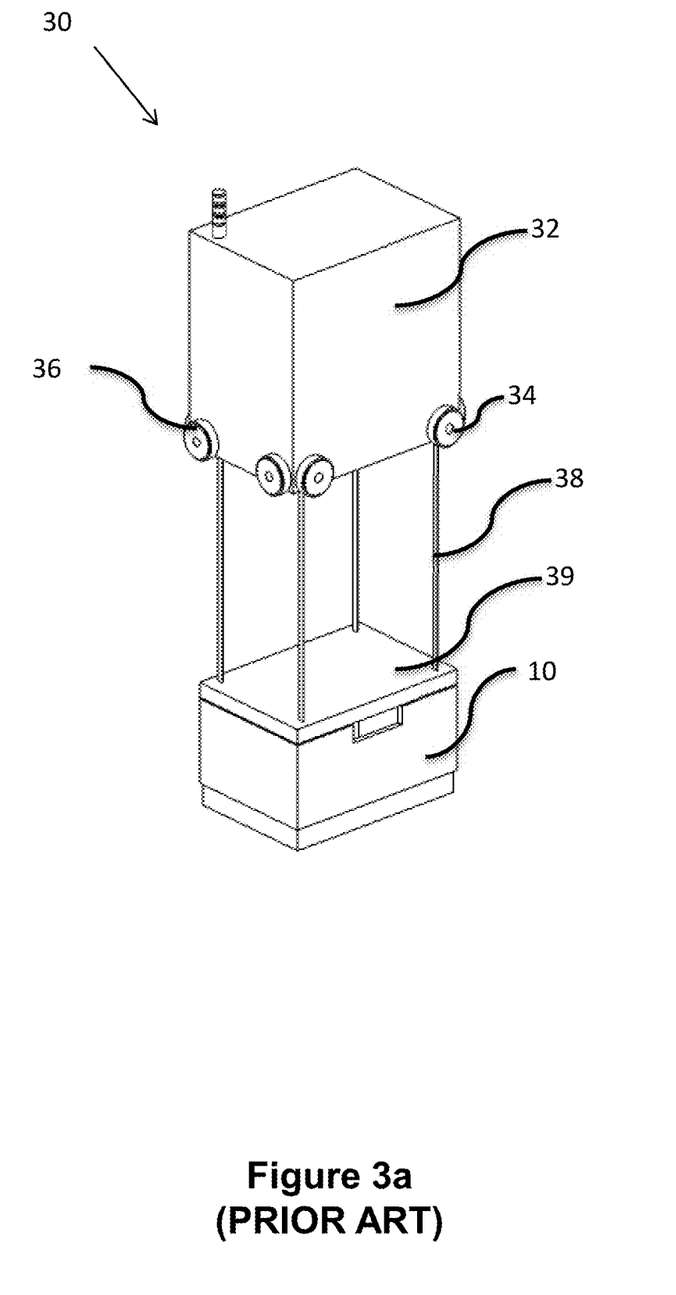
FIGS. 3(a) and 3(b) are schematic perspective views, from the rear and front respectively, of one form of known robotic load handling device for use with the frame structure of FIGS. 1 and 2.
Figures 3B, 3C:
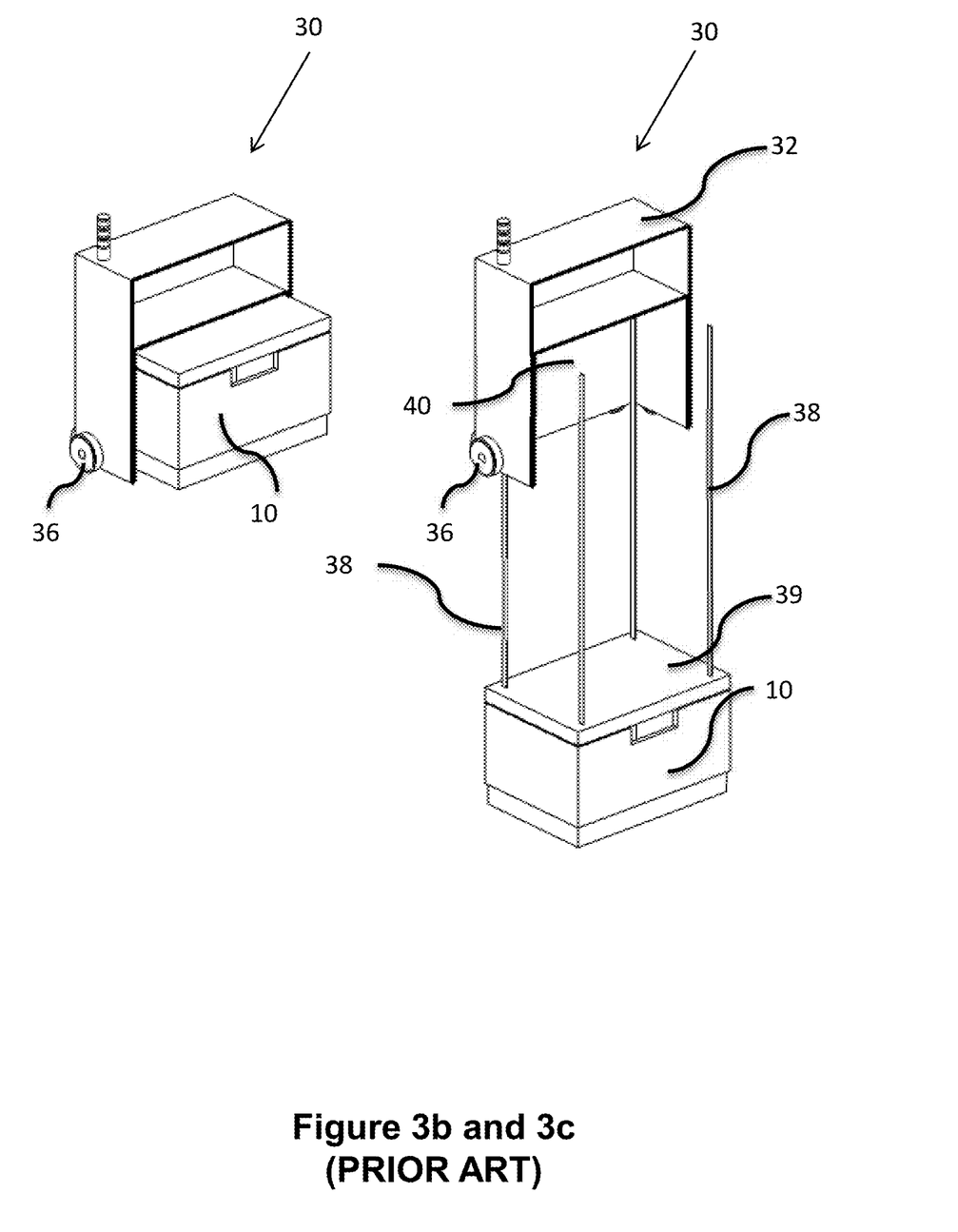
FIG. 3(c) is a schematic, perspective, sectional view of the known load handler device in use, lifting a bin or container.

One form of the invention will now be described with reference to the storage system of FIGS. 1 to 4. In the system as shown in FIG. 1, stackable storage bins 10, are stacked on top of one another to form stacks 12. The stacks 12 are arranged in a frame structure 14 in a warehousing or manufacturing environment. FIG. 1 is a schematic perspective view of the frame structure 14. Each storage bin 10 typically holds a plurality of product or inventory items 28, and the inventory items within a bin 10 may be identical, or may be of different product types depending on the use to which the storage and picking system is put. Furthermore, the storage bins 10 may be physically subdivided to accommodate a plurality of different inventory items 28.

The frame structure 14 of the storage system comprises a plurality of upright members 16 that support horizontal members 18, 20. A first set of parallel horizontal members 18 is arranged perpendicularly to a second set of parallel horizontal members 20 to form a plurality of horizontal grid structures supported by the upright members 16. The members 16, 18, 20 are typically manufactured from metal. The storage bins 10 are stacked between the members 16, 18, 20 of the frame structure 14, so that the frame structure 14 guards against horizontal movement of the stacks 12 of storage bins 10, and guides vertical movement of the storage bins 10.

The top level of the frame structure 14 includes rails 22 arranged in a grid pattern across the top of the stacks 12. Referring additionally to FIGS. 2 to 5, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, is arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 is lifted clear of the rails 22, and the second set of wheels 36 is lowered into engagement with the second set of rails 22a. The drive mechanism can then be used to drive the second set of wheels 36 to achieve movement in the Y direction.

Figure 4:
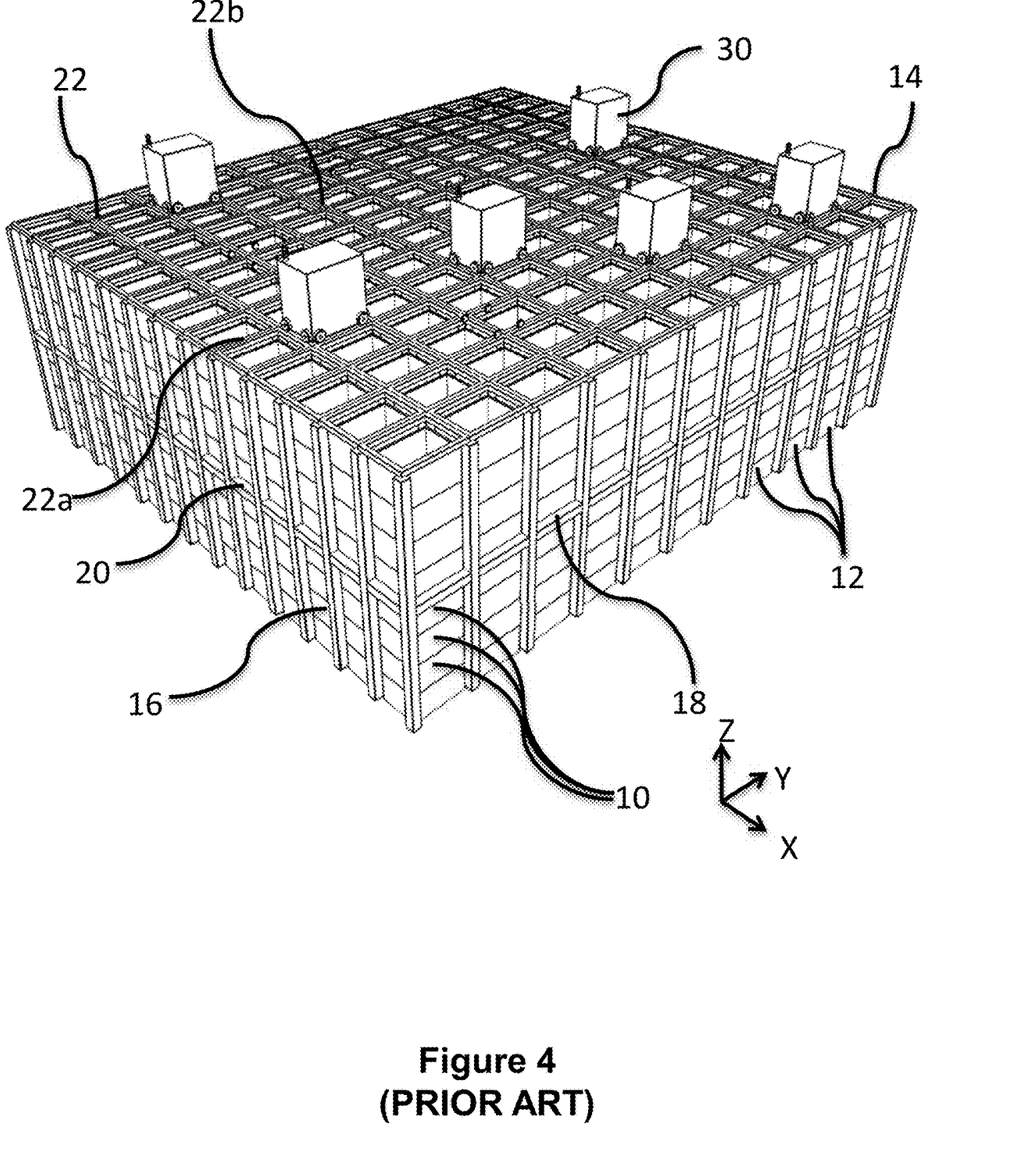
FIG. 4 is a schematic perspective view of a known storage system comprising a plurality of load handling devices of the type shown in FIGS. 3(a), 3(b) and 3(c), installed on the frame structure of FIGS. 1 and 2.

In this way, one or more robotic load handling devices 30 can move around the top surface of the stacks 12 on the frame structure 14, as shown in FIG. 4 under the control of a centralised control utility (not shown). Each robotic load handling device 30 is provided with lifting means 38 for lifting one or more bins 10 from the stack 12 to access the required products.

The body of the vehicle 32 comprises a cavity 40, the cavity 40 being sized so as to hold a storage bin 10. The lifting means 38 preferably comprises winch means and a storage bin 10 gripper assembly 39. The lifting means 38 lifts a storage bin 10 from the stack 12 to within the cavity 40 in the body of the vehicle 32.

In this way, using a plurality of robotic load handling devices 30 on a grid-based storage system allows multiple products to be accessed from multiple locations in the grid and stacks 12 at any one time.

Figure 5:
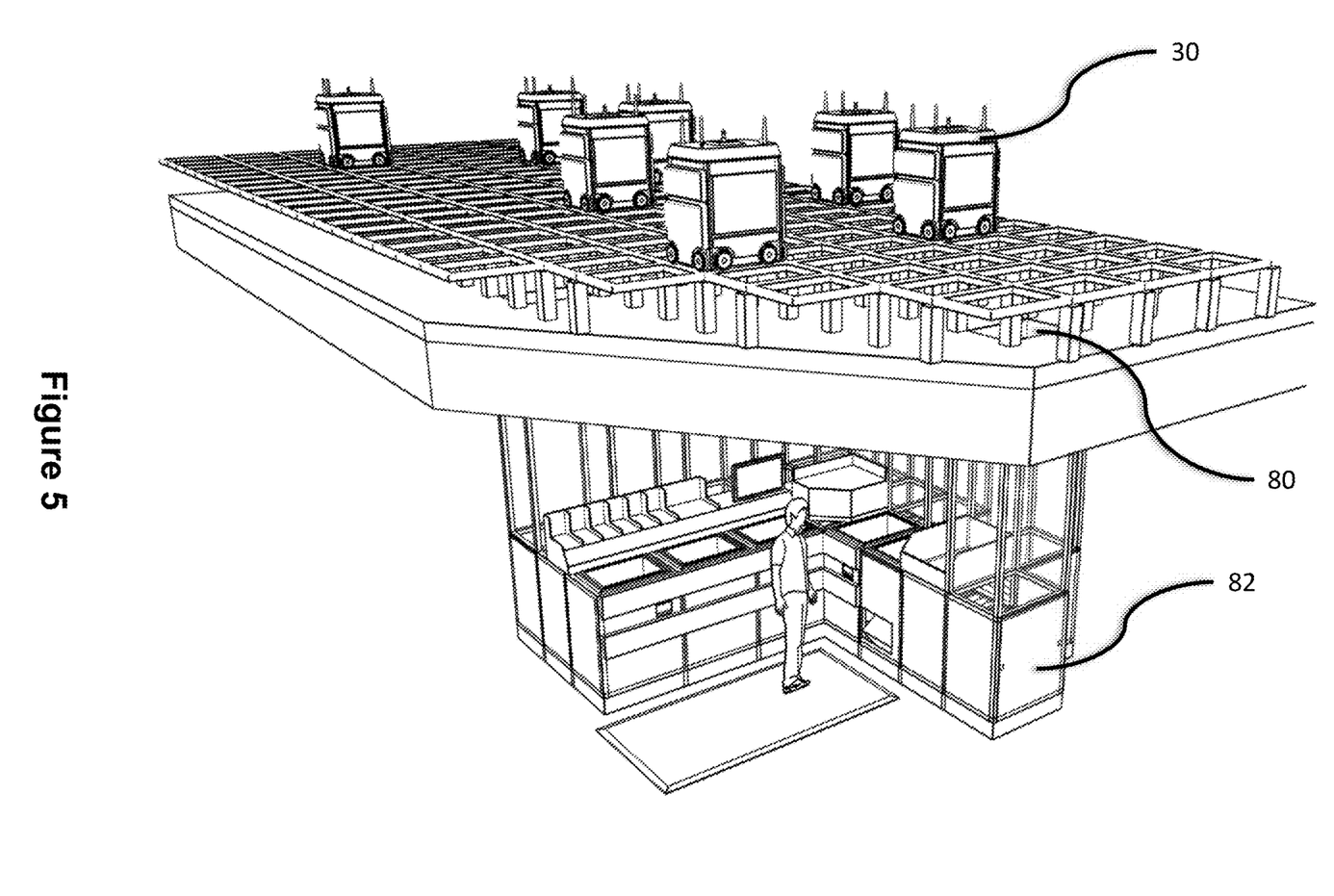
FIG. 5 is a schematic perspective view of the known system of FIGS. 1 to 4, further showing an output port through which storage containers are lowered by load handling devices to a pick station where items to be picked are removed from storage containers and picked in to delivery containers.

As can be seen in FIG. 5, the storage system further comprises at least one output port 80. The output port 80 acts as a drop off point at which a load handling device 30 lowers a bin or container 10, carried within the body of the load handling device having been previously lifted from a stack 12 of containers 10, to a pick station 82.

In use, the storage bin or container 10 containing the required inventory item or items 28 needed to fulfil a customer order is lifted from a stack 12 by a load handling device 30.

Once lifted by the load handling device 30, the storage bin or container 10 is transported within the body of the load handling device 30 and delivered by the load handling device 30 to an output port 80 above or adjacent a pick station 82 or to the pick station 82 per se.

Inventory items 28 required from the carried and deposited storage bin or container 10 are picked by an operative 92 from the storage bin or container 10 to the delivery container DT located in the pick station 82.

In the example shown in FIG. 5, it will be appreciated that the drop off point on the storage system is above the pick station 82 but that this is just one example of configuration of pick station 82 that may be used. At the pick station 82, the required inventory item or items 28 may be manually or robotically removed from the storage bin or container 10 and placed in a delivery container DT, the delivery container DT forming part of the customer order, and being filled for dispatch at the appropriate time. It will be appreciated that the delivery container DT may require a number of inventory items 28 from a plurality of storage bins or containers 10 to be picked thereto and as such the delivery container DT may remain in the pick station 82 until the required inventory items 28 have been delivered by the required load handling devices 30 to the output port 80 associated with the particular pick station 82.

A first embodiment of an order picking system in accordance with one form of the invention is shown in FIGS. 6a, 6b, 6c, 6d, and 6e.

Figure 6A:
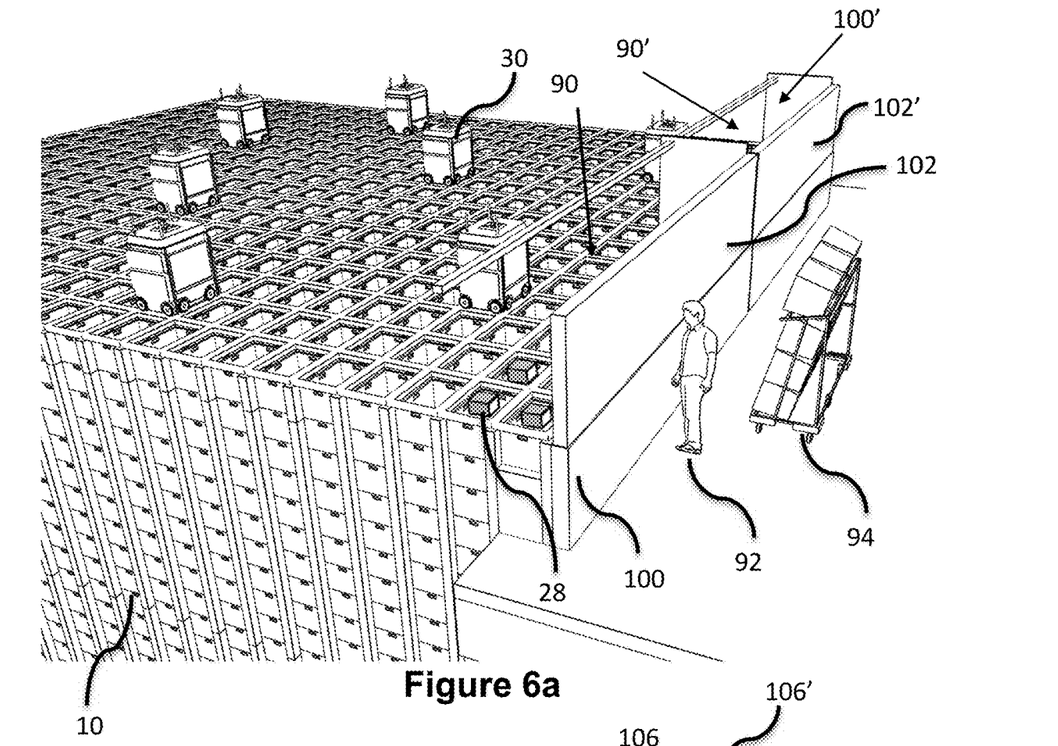
FIGS. 6a, 6b, 6c, 6d and 6e are schematic perspective views of a first embodiment of the invention in which the storage system comprises a movable structural portion, the movable structural portion comprising a wall portion, a frame and a support, the movable acting so as to safely divide at least one row of storage containers from the remainder of the storage system.

As shown in FIG. 6a, the storage system in accordance with one form of the invention comprises the structure of the storage system described with reference to FIGS. 1 to 5 above. As can be seen in FIG. 6a, the system comprises a plurality of load handling devices 30 operable on the storage system in the manner described above with reference to FIGS. 1 to 5.

In accordance with one form of the invention as described in more detail below, the storage and picking system of FIGS. 6a, 6b, 6c, 6d, and 6e comprises at least one row of storage bins or containers 10 selectably accessible to an operative 92. In this way, direct access of the inventory items 28 in the bins or containers 10 located at the edge of the storage system is possible. As access to at least one row of containers or bins 10 is possible, in a controlled manner, it is possible to configure an edge portion of the storage system to act as a temporary pick station in the event that the more conventional pick stations 82 described above are all in use and higher throughput is required—such as on Black Friday or at Christmas.

Figure 6B:
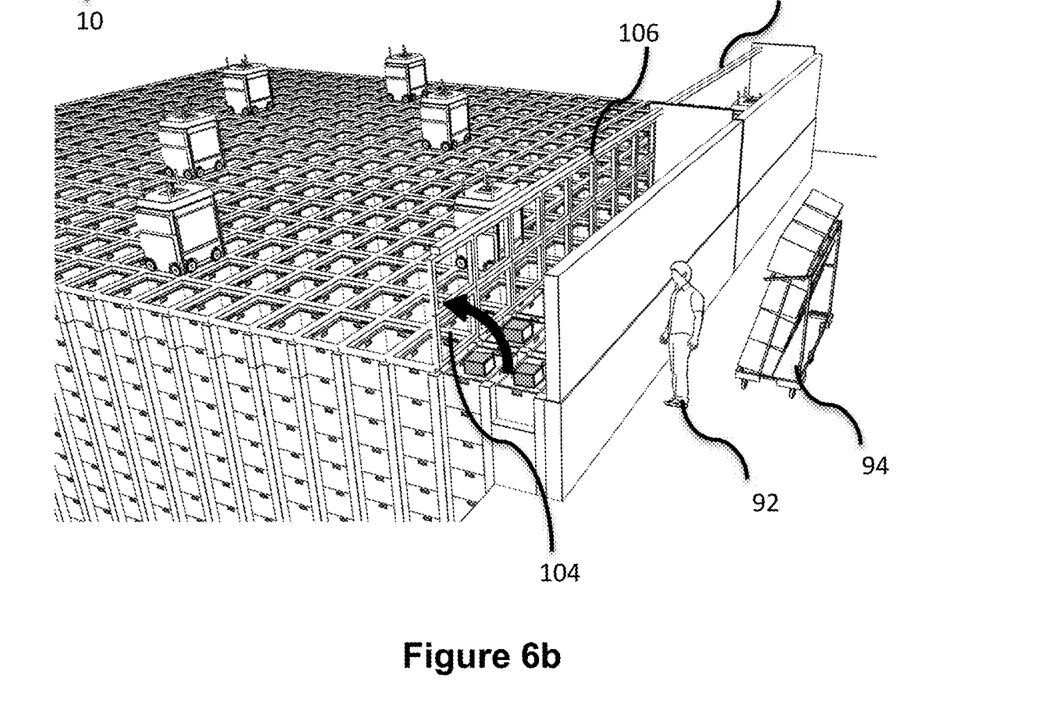

As shown in FIGS. 6a and 6b, the operative 92 is located on a level of the storage system corresponding to a top level of containers or bins 10 and the tracks or rails 22 on which the load handling devices 30 are operable. The storage system, in accordance with one aspect of the invention, is further provided with a movable barrier system enabling an operative 92 to safely access inventory items 28 in containers or bins 10 located in at least one row of the top layer of the storage system whilst preventing the load handling devices 30 from traversing the area accessible to the operative 92.

FIG. 6a shows two such areas 90, 90' of the storage system accessible to an operative 92 in a controlled manner. The operation of one of the areas will be described in detail. It will be appreciated that the other area depicted in FIGS. 6a, 6b, 6c, 6d and 6e may be controllably accessed by the operative 92 in a similar manner using similar components as described.

As shown in FIG. 6b, the moveable barrier system 100, 100' comprises a wall portion 102, 102', a frame portion 104, 104' and a support portion 106, 106'. The frame portion 104, 104' may comprise a section of tracks or rails 22 forming part of the grid-like track and rail 22 network on which the load handling devices 30 are operable.

FIG. 6a shows the barrier system 100, 100' in a first position in which the load handling devices 30 are controllably movable under the control of a computer control utility (not shown) on the whole network of tracks and rails 22. The load handling devices 30 are free to lift and deposit bins or containers 10 from and into any of the stacks 12 as required and instructed by the computer control utility.

In use, when an operative 92 requires access to inventory items 28 in storage bins or containers 10 in the rows adjacent the edge of the storage system, the frame 104 is moved from a first position where it may act as tracks or rails 22 for the robotic load handling devices 30, to a second position where it acts as a barrier to prevent access to the exposed row or rows of storage containers or bins 10.

The frame 104 may pivot around a point on the uprights of the storage system and move in a direction as indicated by the arrow in FIG. 6b. It will be appreciated that any suitable mechanism may be used to pivot the frame 104 from the first position in to the second position. Furthermore, it will be appreciated that the movement need not be a pivoting movement but any suitable way of moving the frame from the first position in to the second position may be envisaged. It will further be appreciated that the frame need not comprise a section of rails or tracks 22 but may be formed from any other means locatable in the vicinity of the rail and track 22 network whilst not impinging on the movement of the load handling devices 30 on the storage system.

Figure 6C:
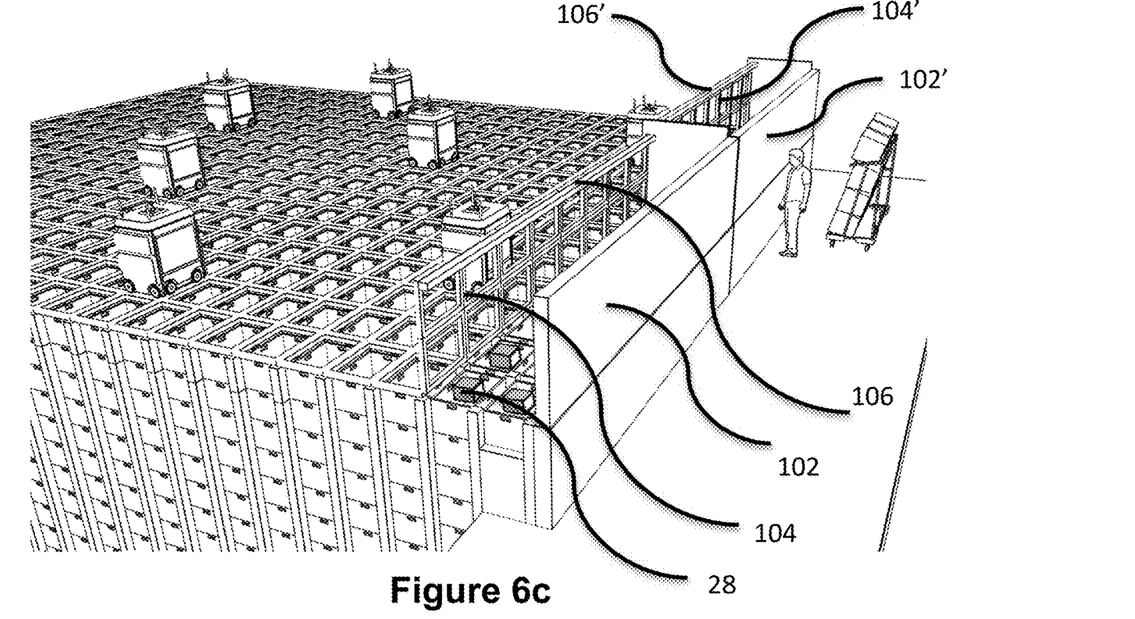

As shown in FIG. 6c, when moved in to the second position, the frame 104 abuts the support 106, the support 106 providing rigidity to the frame 104 such that the operative 92 is protected from the load handling devices 30 in use on the remaining rails and tracks 22 of the storage system. It will be appreciated that the frame 104 may be releasably attached to the support 106 by fastening or locating means (not shown) such releasable fastening means providing further structural integrity to the frame 104. Furthermore, such releasable fastenings may comprise interlocks so as to ensure no further movement of the barrier system may be undertaken until the interlocks are fastened in position.

Figure 6D:
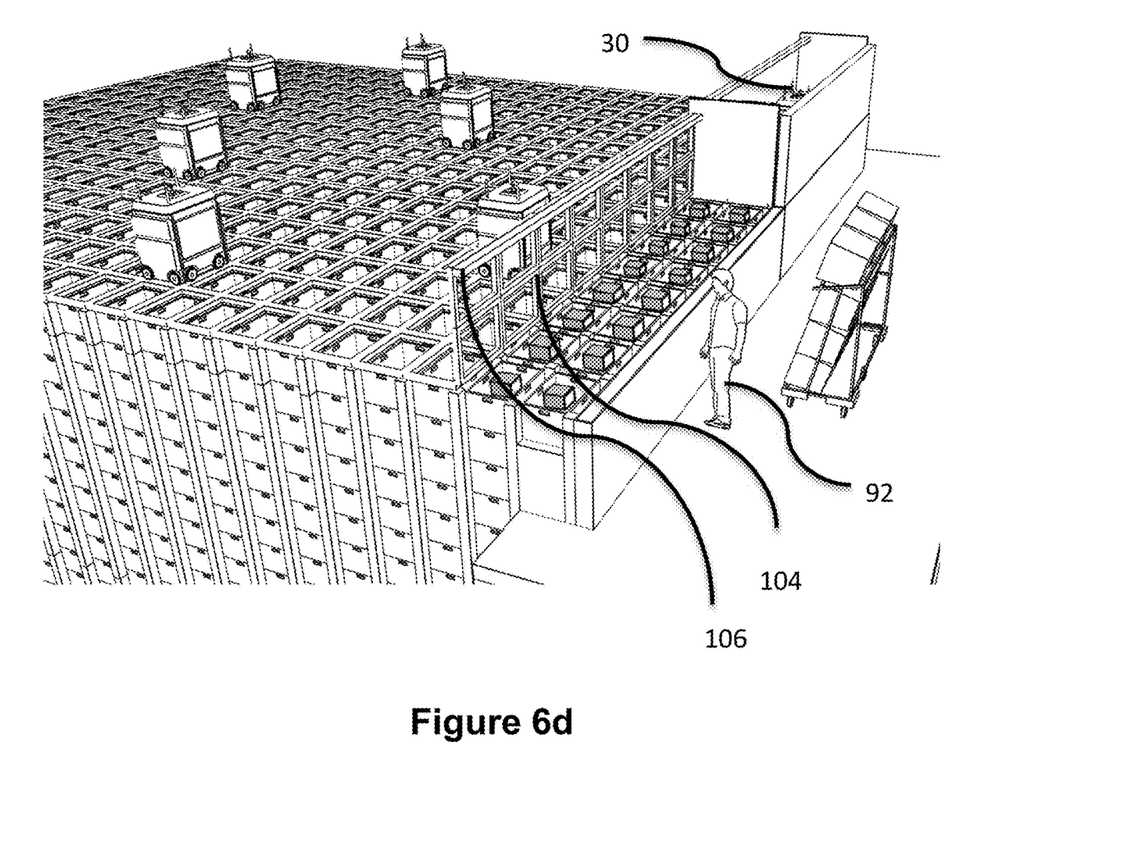

Once the frame 104 is in the second position acting as a barrier to entry on to the storage system, and any interlocks have been activated, the wall portion 102 may be lowered as shown in FIG. 6d so as to expose the rows of storage containers or bins 10 to the operative 92. It will be appreciated that whilst the embodiment shown in FIG. 6d depicts the wall portion being lowered in a downwardly direction any suitable stowing mechanism may be envisaged that allows access to the exposed rows of bins or containers 10.

Whilst the wall portion 102 is shown as a solid structure it will be appreciated that any suitable form of deployable barrier may be used. For example a concertina-type structure or a roller-type barrier may be used. Again the wall portion 102 or deployable barrier may be provided with suitable interlock-type safety systems.

As shown in FIG. 6d, once the frame 104 is deployed and the wall portion 102 is in the second position, it is possible for the operative 92 to access the storage containers or bins 10. In this way, the operative 92 can remove inventory items 28 from the storage containers or bins 10. The operative 92 may remove the required items 28 and pick them directly in to delivery containers DT mounted on a suitable frame or trolley 94 using a basic known trolley pick system of picking. Whilst less sophisticated than the picking system described above with reference to FIGS. 1 to 5, the ability to pick items directly from the storage system enables the throughput of a given storage system to be temporarily increased for little additional expenditure.

As further shown in FIG. 6d, only one area of the storage system is accessible by the operative 92. The second area of the storage system available for edge picking remains inaccessible to the operative 92 as the wall portion 102', frame 104' and support 106' are in the first position. It will be noted that in this position the second area of the storage system remains accessible to the robotic load handling devices 30 such that storage locations can be replenished as required. Furthermore, in the event that the second area for edge picking is not required, the storage locations may be utilised by the storage and picking system in the manner described with reference to FIGS. 1 to 5.

Figure 6E:
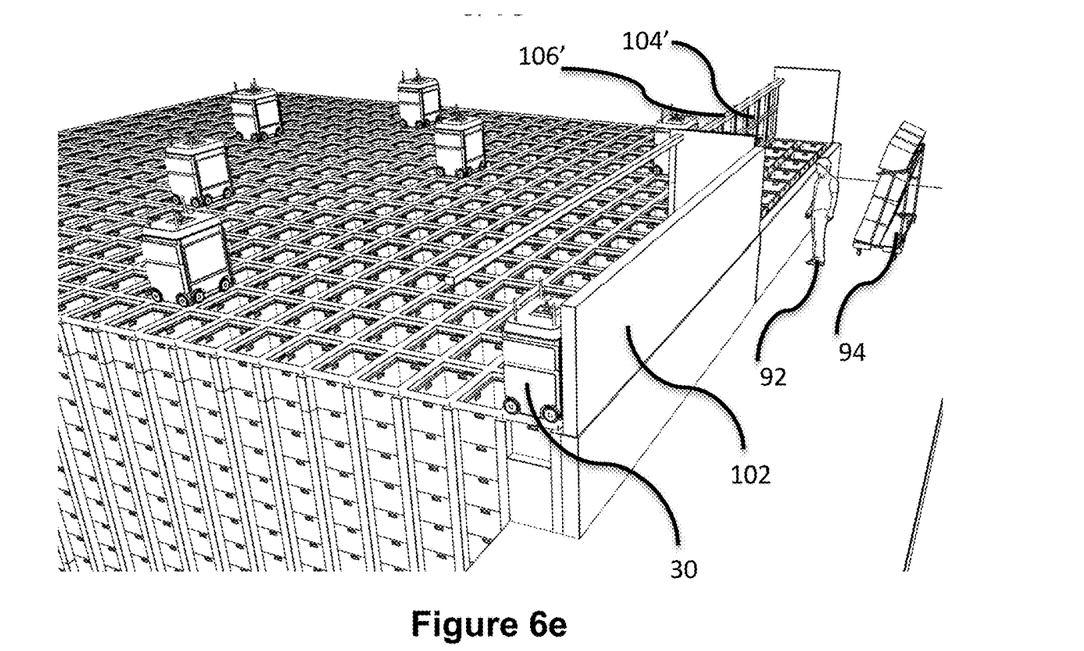

FIG. 6e shows the system described above but with the second area of the storage system accessible to the operative 92 for manual edge picking of inventory items whilst the first area has been partitioned by the movable barrier system described above so as to prevent access on to the storage system by the operative 92 and to allow the robotic load handling devices 30 to replenish the storage locations as required.

Figure 7A:
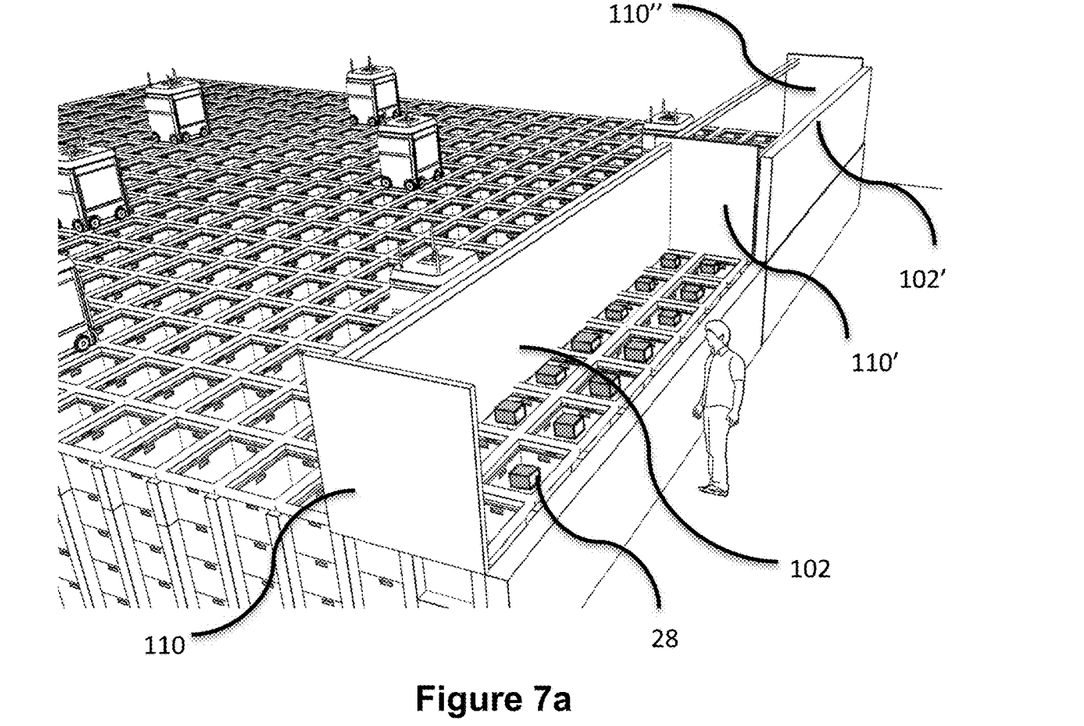
FIGS. 7a, 7b and 7c are schematic perspective views of a second embodiment of the invention in which the movable structural portion comprises a movable wall, the wall being slidably movable across a portion of the storage system so as to expose at least one row of storage containers to an operative for item picking.
Figure 7B:
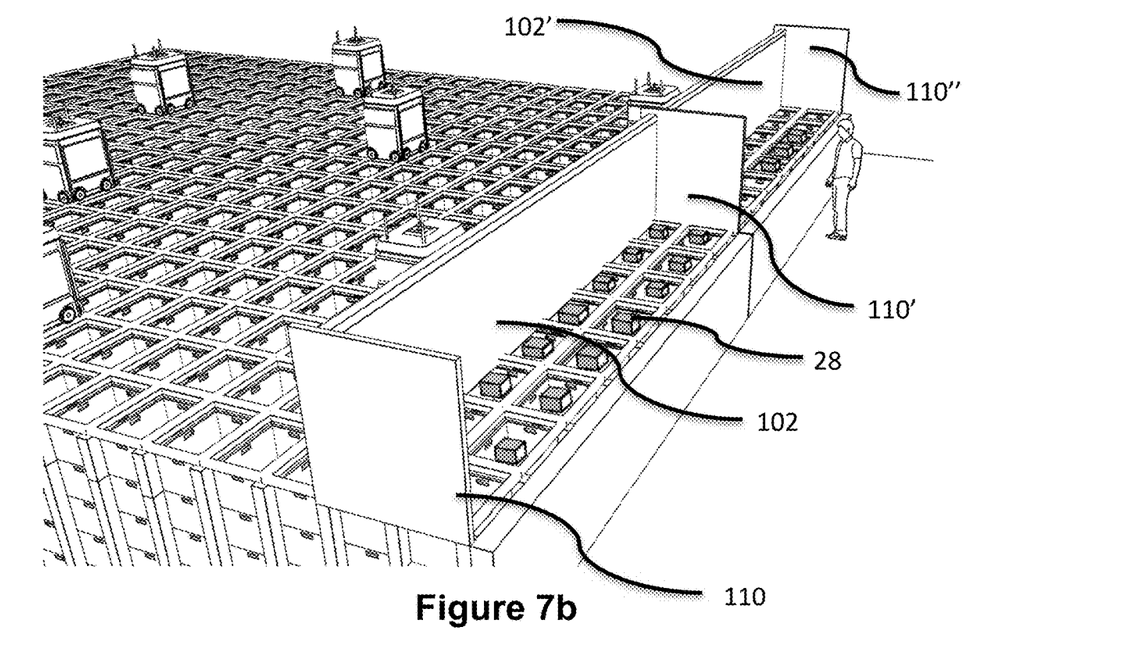
Figure 7C:
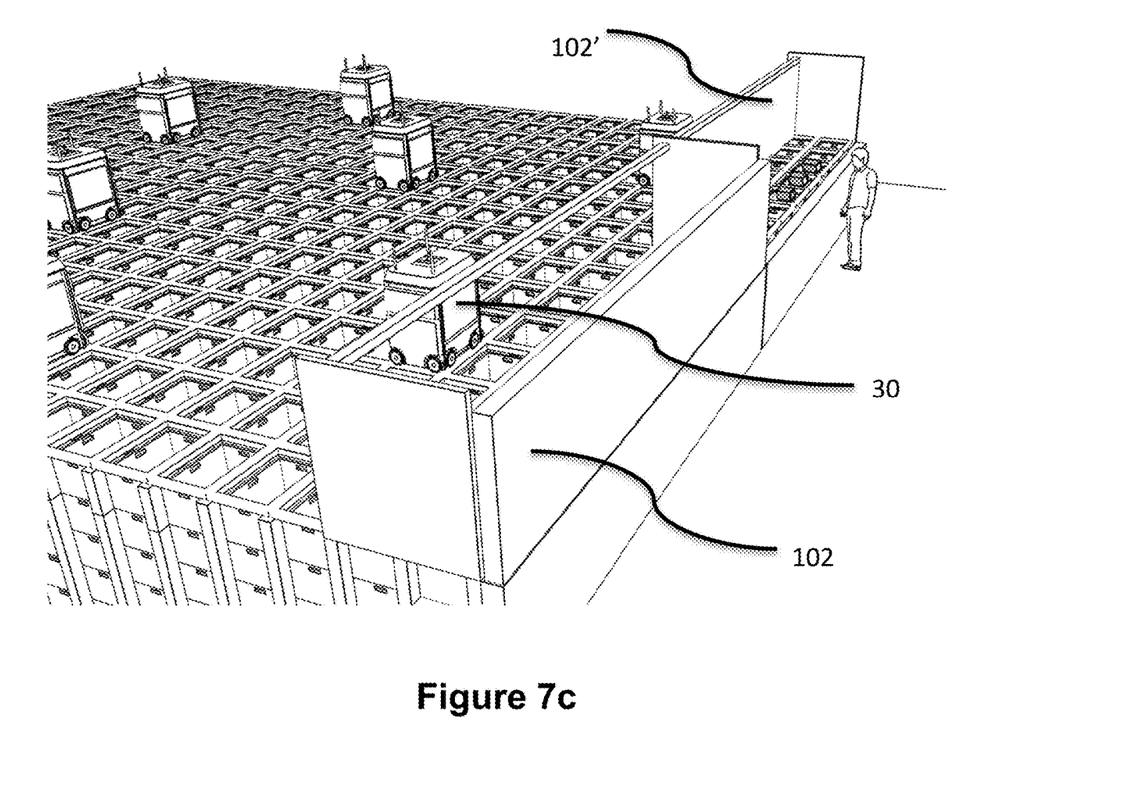

In a second embodiment of the invention as shown in FIGS. 7a, 7b and 7c, the movable wall portions 102, 102' are supported by end sections of wall 110, 110', 110". The wall portions 102, 102' move from a first position where the storage containers or bins 10 are not accessible to the operative 92, to a second position where at least one row of storage containers or bins 10 is accessible to the operative 92. In the second embodiment, the wall portions 102, 102' slidably move, supported by the end sections 110, 110', 110" and form a barrier between the operative 92 and the storage system whilst exposing a predetermined number of storage locations comprising containers or bins 10.

The end sections of wall 110, 110', 110" comprise engaging means to engage and support the wall portions 102, 102'. Furthermore, the end walls 110, 110', 110" may comprise motor means to drive the movement of the wall portions 102, 102' from the first to the second position. FIG. 7a shows the first wall portion 102 in the second position and the second wall portion 102' in the first position in which the operative 92 is prevented from accessing the storage locations.

FIG. 7b shows both wall portions 102, 102' in the second position thereby enabling operative 92s to access the storage locations along the whole of one side of the storage system and engage in picking inventory items directly from the storage bins or containers 10.

FIG. 7c shows the second wall portion 102' in the second position and the first wall portion 102 in the first position in which the operative 92 is prevented from accessing the storage locations. As can be seen in FIG. 7c, robotic load handling devices 30 may access the first storage area to replenish the storage locations as required.

In both of the embodiments described above, it will be appreciated that the exposed storage locations comprising storage bins or containers may be angled so as to improve the picking position for the operative 92. Alternatively, a first row of storage locations may be positioned lower with respect to the second row of exposed storage bins or containers 10 again providing improved picking positions for the operative 92.

In all the embodiments described above, the wall portions 102, 102' may comprise solid or rigid structures or alternatively may comprise roller or concertina barrier means.

Furthermore, the moveable portions may move on rails, sliders, rolling means, wheels or on any suitable track structure or by any other suitable method. The wall portions may be manually moveable or automatically movable under the control of the computer control utility (not shown). Movement of the movable portions may be carried out using actuators, hydraulics or motors engaging with worm gears as appropriate. It will be appreciated that these are examples only and any suitable mechanisms may be used.

It will be appreciated that all the mechanisms described above are exemplary only and any suitable mechanisms may be used capable of fulfilling the purposes described.

FIGS. 6 and 7 depict a storage system where one side may be converted to a temporary manual edge picking areas. However, it will be appreciated that such temporary edge picking locations may be limited to only a portion of one side of the system or alternatively portions of any side of the storage system and need not be of a size shown in the Figures.

It will be appreciated from the foregoing that the invention aims to provide access to the storage portion of the storage system to enable additional processes to be performed on and to the containers within the system. For example, the ability to access the edge of the storage system enables inventory items to be directly placed in to storage containers either manually by an operative or using a suitable form of robotic placement means. This enables additional inventory to be input in to the system in the event that automated inputs are not available or cannot adequately input sufficient inventory in to the system. Moreover, empty delivery containers DT may be input in to storage containers 10 to form nested containers, the delivery containers DT comprising bags or other inserts awaiting placement or picking of inventory items thereto.

Furthermore, the ability to access the edge of the storage system enables delivery containers DT nested in storage containers 10 to be accessed and removed from the storage containers 10. In this way, delivery containers DT can be removed from the storage system in the event of malfunction of delivery container output automation or indeed if more delivery containers DT comprising customer orders are required to be dispatched in a short timeframe.

Moreover, the system described above may be used in for example, a storage and picking system forming part of an online grocery retail operation. However, it will be appreciated that the system need not be limited to such usage. For example the system may be used in a general merchandise online retail operation or any other operation where manual access to storage locations may improve throughput for a given system size. Furthermore, the system may be used in a post and parcel sortation facility, for example, for the consolidation of parcels in to a single bin for onward transportation to a single destination.

The invention claimed is:

1. A grid-based storage system included in a system for picking items from storage, the storage system comprising:
   at least one load handling device operable on rails or tracks, the rails or tracks being disposed on substantially horizontal members of a frame structure; and
   a series of storage containers including items to be stored, the storage containers being positioned below the substantially horizontal members of the frame structure and arranged on top of one another in stacks, the stacks being arranged in rows within the frame structure,
   wherein a portion of the frame structure is moveable between a first position where the portion of the frame structure is substantially horizontal and a second position where the portion of frame structure acts as a barrier dividing at least one row of storage containers from other rows of the storage system enabling an item picker to access safely the at least one row of storage containers while preventing the at least one load handling device from traversing the area accessible to the item picker.

2. A storage system according to claim 1, comprising:
   a movable wall portion, the wall portion being movable between a first position where the storage containers are inaccessible to the item picker and a second position where the at least one row of storage containers is accessible to the item picker located at an edge of the storage system.

3. A storage system according to claim 1, comprising:
   a support configured to releasably attach to the portion of the frame structure when in the second position.

4. A storage system according to claim 3, in which the support comprises an interlock mechanism.

5. A storage system according to claim 1, comprising:
   at least one motor, or hydraulic, or actuator by which the portion of the frame structure is moved between the first position and second positions.

6. A storage system according to claim 1, in which the movable wall portion comprises:
   a solid wall structure, or a roller shutter, or a concertina structure.

7. A storage system according to claim 1, in which the rails or tracks form a network of grid spaces, with stacks of containers occupying a footprint of a single grid space.

8. A storage system according to claim 1, in which the at least one load handling device is configured to occupy only a single grid space.

9. A storage system according to claim 1, in which the storage system and the picking system forms part of an online grocery retail facility.

10. A storage system according to claim 1, in which the storage system and the picking system forms part of a parcel and post sortation facility.

11. A storage system according to claim 1, comprising:
    at least one motor, or hydraulic, or actuator by which the movable structural means are moveable from a first position to a second position.

12. A storage system according to claim 1, in which the movable structural means comprises:
    a solid wall structure, or a roller shutter, or a concertina structure.

13. A storage system according to claim 1, wherein the movable structural means comprises interlock mechanisms.

14. A storage system according to claim 1, wherein the rails or tracks which form a network of grid spaces, with stacks of containers occupying a footprint of a single grid space.

* * * * *